Jan. 7, 1936.　　　　　G. FAST　　　　　2,026,733

FRICTION CLUTCH

Filed Oct. 8, 1932　　　7 Sheets-Sheet 3

INVENTOR
Gustave Fast
BY
H. C. Wiesend
ATTORNEY

Jan. 7, 1936. G. FAST 2,026,733
FRICTION CLUTCH
Filed Oct. 8, 1932 7 Sheets-Sheet 4

INVENTOR
Gustave Fast
BY
H.C. Lieserus
ATTORNEY

Jan. 7, 1936. G. FAST 2,026,733
FRICTION CLUTCH
Filed Oct. 8, 1932 7 Sheets-Sheet 5

INVENTOR
Gustave Fast
BY
H. C. Shiseure
ATTORNEY

Jan. 7, 1936.                G. FAST                 2,026,733
                          FRICTION CLUTCH
                        Filed Oct. 8, 1932          7 Sheets-Sheet 6

INVENTOR-
Gustave Fast
BY
H. C. [signature]
ATTORNEY-

UNITED STATES PATENT OFFICE 2,026,733

FRICTION CLUTCH

Gustave Fast, Annapolis, Md., assignor to Gustave Fast Engineering Corporation, Annapolis, Md., a corporation of Maryland Application October 8, 1932, Serial No. 636,815

26 Claims. (Cl. 192—69)

This invention relates to improvements in friction clutches for automotive and industrial uses, and embodies, in a clutch of the general type described in my Patent No. 1,984,337, granted December 11, 1934, numerous improvements and novel features. The present construction is particularly suited to the connection and disconnection of the driving and driven parts of automobiles and other vehicles, as well as other heavy power driven machinery of all kinds. The engagement and disengagement of the clutch mechanism may be controlled manually or by means of a foot pedal or by any other suitable means.

One object of the present invention is to provide for a relatively large clutch engaging pressure while at the same time minimizing the amount of work to be performed in effecting the engagement or the disengagement of the clutch.

A further object is to provide a structure in which the maximum pressure or force to be applied by the operator in effecting engagement of the clutch is reduced, by an equalization of this pressure throughout the stroke of the engaging mechanism, thus eliminating pressure "peaks".

Another object is to provide friction members of such nature as to insure a high percentage of surface contact between the friction elements during engagement. The friction elements are so constructed and their engaged surfaces are formed of such materials that minor surface irregularities will be corrected by the application of the clutch pressure.

A further feature of the invention is the provision of means for spacing the several friction elements, when disengaged, so as to minimize the "drag" of the clutch. Means are also included to provide for ready adjustability of the clutch to compensate for wear, or to increase its capacity to transmit torque or for any other purpose.

An additional feature is the provision of means for dissipating the heat generated by engagement of the friction members, thus preventing the harmful heating of the friction members and of the lubricant or clutch "dressing". The improved construction is also such as to insure the provision of a lubricant or dressing film of a continuous nature, whereby actual metallic contact between the friction members is prevented and adequate lubrication to prevent wear is provided when the clutch is being engaged. The features of the invention may be applied either to a clutch for coupling and uncoupling two alined shafts or to a clutch on a single power shaft for connecting one or more machines to the shaft. In the latter case a series of such clutches may be employed to connect a corresponding series of machines to the line shaft.

As in the earlier application identified above, spring friction members having high resilience and being adapted to be either compressed or expanded are employed, for the double purpose of promoting the effective contact of the friction surfaces and of effecting a speedy disengagement of such surfaces upon removal of the clutch pressure. In the earlier application the friction members, except the end members, are in the shape of a double frustum of a cone, the members of one set being adapted to be contracted on both sides of a median plane by application of the clutch pressure while the members of the other set are expanded on both sides of the median plane. In accordance with the present invention these members are in the form of a single frustrum of a cone or in other words two of these members are employed back to back in lieu of the single member of the prior construction. This serves to eliminate any interference between the conical formations at the two sides of the median plane. Irregularities in the contacting surfaces at one side of the median plane between the pairs of friction members will have no distorting effect upon the adjacent members at the opposite sides of the median planes.

A particular feature of the present invention is the provision of friction surfaces, upon one set of the friction members, formed of a relatively plastic material, such as a relatively soft bronze or Babbitt metal, for the purpose of correcting minor surface irregularities and still further increasing the effective area of the friction members employed. If desired, vulcanized rubber may be used in place of the plastic metal as the surfacing material, in which case water is preferably used as the lubricant or clutch dressing.

The clutch pressure is applied preferably by means of a cam action or a cam and lever or toggle action. A special feature of the invention is the conformation of the cam surface in such a way that the rate of increase of the stored energy in the friction members is made directly proportional to the extent of movement of the actuating devices, thereby permitting a substantially uniform force to be applied to the actuating devices throughout the clutch engaging movement and thus decreasing the maximum force necessary to effect the engagement and disengagement of the clutch. The force required to actuate the clutch is substantially uniform.

Hydraulic drag is minimized by the provision of spacing spring means for equalizing the free space between the friction members when idling. The foregoing features, as well as other features and advantages of the invention, will be understood more fully from the detailed description which will now be given in conjunction with the accompanying drawings, in which:

The clutch of Figs. 1–7 inclusive is of relatively heavy construction, and is adapted primarily for use with heavy industrial or other machinery. In this embodiment of my invention, which is illustrated as being adapted to be actuated by a hand lever, the clutch casing I and associated parts may be considered to constitute the driven member, while the hub 2 and its associated parts comprise the driving member. It will be understood that the driving and driven members are connected in a convenient manner with a pair of alined shafts, the one associated with a suitable driving source and the other associated with a machine or part to be driven.

Figure 1:
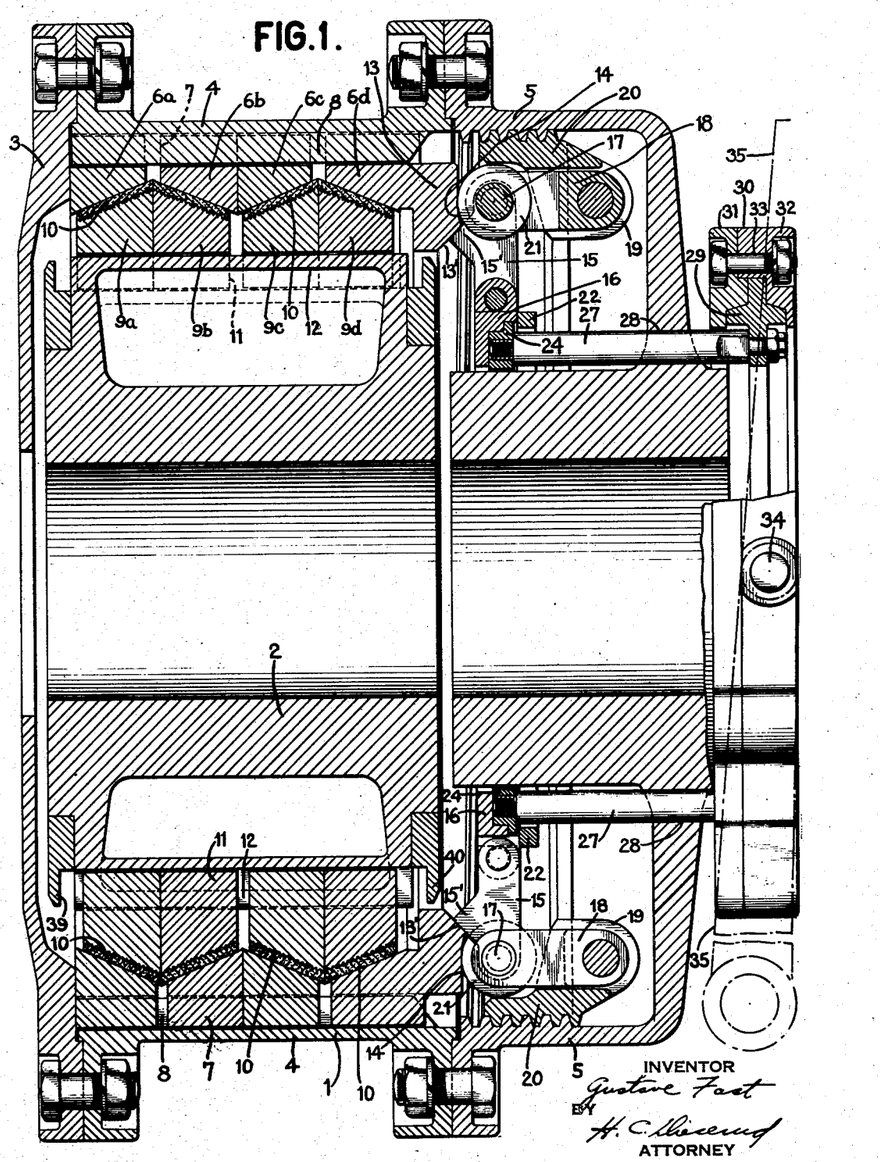
Fig. 1 is a vertical longitudinal section through a clutch, constituting one embodiment of my invention, with a portion shown in elevation to illustrate the actuating lever and connection.
Figure 2:
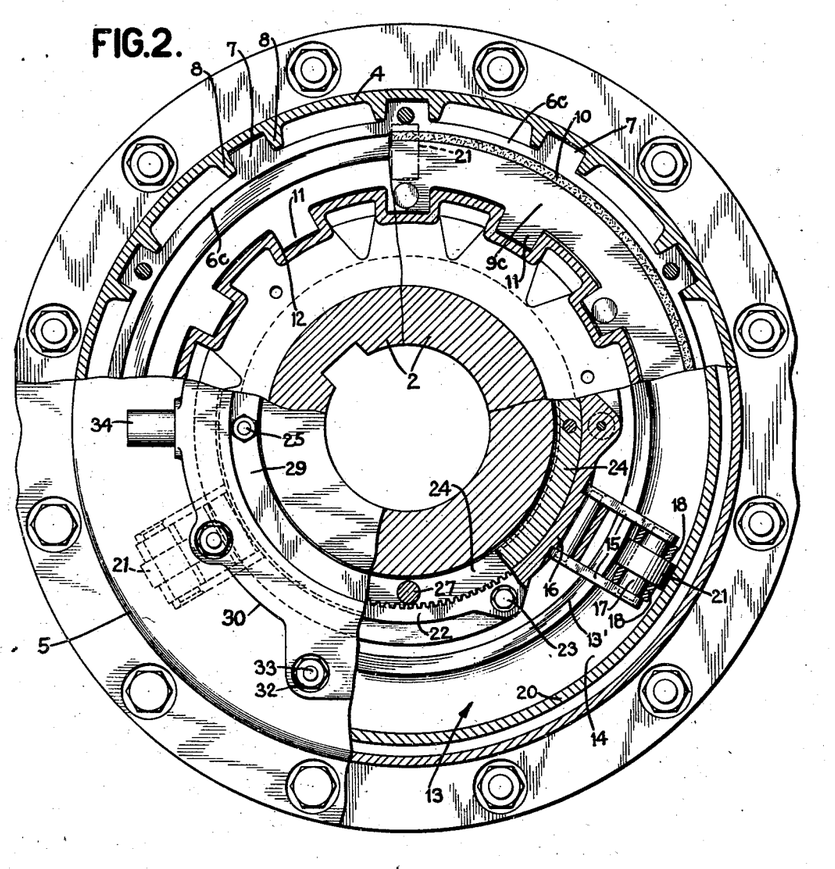
Fig. 2 is a transverse, vertical section through the construction of Fig. 1, the various quadrants being taken along several different planes, to illustrate various features of the internal construction, the lower left hand quadrant being in elevation.

While the casing I, for convenience, is composed of three parts, namely, the end plate 3, barrel 4 and hub casing 5, it will be generally designated hereinafter simply as the casing I. Friction members 6a, 6b, 6c and 6d (hereinafter collectively referred to as rings 6) formed of a metal of high resilience under tensile stresses, such as steel, are provided within the casing and are machined to a fine surface. These members are splined to the barrel 4 (as illustrated in Fig. 2) the lugs 7 being slidably engaged between the longitudinally extending radial projections 8 of the barrel, to permit of longitudinal and a slight radial relative movement between the rings 6 and barrel 4, but not permitting relative angular movement therebetween. As seen in Fig. 1, the inner surfaces of the rings 6 are of conical or frusto-conical form, as are the cooperating outer surfaces of a series of rings 9a, 9b, 9c, and 9d (hereinafter collectively referred to as rings 9). These surfaces are so arranged that the generating element is at a comparatively small angle, preferably 10° to 30°, to the axis of the rings, although larger or smaller angles may suitably be employed. The rings 9, like the rings 6, are preferably of steel, but are provided with surfaces 10 of soft metal, preferably a soft bronze containing upwards of 15% of lead, or Babbitt metal, which may be applied to the steel rings at high temperature by a casting method, or by any other suitable method which will insure a good bond or firm connection between the two metals. The outer surfaces of the steel portions of the rings 9 will preferably be roughened or grooved or provided with shoulders to more firmly unite the steel and the softer metal.

Rings 9 are slidably mounted upon the hub 2, they being provided with projections 11 adapted to be engaged within grooves 12 formed in the outer surface of the hub 2 (Fig. 2). The rings 6 and 9, as in my prior application before mentioned, are complete, unbroken members surrounding the hub 2. It will be readily perceived that if pressure acting toward the left (Fig. 1) is applied to the ring 6d, the surfaces of the several cooperating pairs of rings 6 and 9 will be brought together and the friction thus set up will serve to transmit torque from the hub 2 to the casing I.

The ring 6d is formed with an annular projection 13, upon the end of which a cam surface 14 is formed. If desired the portion 13 may be formed as a separate ring independent of the ring 6d and simply abutting the latter. The clutch engaging pressure may be applied to the cam surface 14 by means of a toggle mechanism, a plurality of toggles being provided at spaced points around the ring. Each toggle includes a link 15 pivoted at its lower end to a shifting ring 16, and at its upper end to a stud or shaft 17. As shown in Figure 2 the link 15 is in the form of a frame having two side members pivoted in the manner explained and connected at their outer ends by the stud 17. A link 18 is forked at one end, which is pivotally connected to the stud 17, while the opposite end of this link is connected to an inwardly projecting arm 19 formed on an adjusting ring 20.

The cam surface 14 is of arcuate cross section, the arc being of a radius greater than the radius of the roller 21 mounted on the stud 17. Preferably also the center of curvature of the arc is at a point in or below a horizontal plane passing through the pivotal axis of the link 18.

By so forming the cam surface a more uniform shipper force is obtained than if a straight radial cam surface were employed. It would, in fact, be possible to so form the cam surface 14 that the shipper force would remain constant throughout its stroke. This, however, would require a rather complicated shape which would be quite difficult to accurately machine. I have found that by making the cam surface 14 with a curvature of suitable radius a substantially uniform shipper force can be applied for engaging the clutch, and such a surface may be very readily and accurately machined. The radius of curvature of the surface may vary widely in accordance with the particular requirements and the dimensions of other portions of the structure. I have found by way of example that if the axis of the roller 21 is swung about an arc of 2 inch radius, the roller being of ¾ inch radius, and the friction element 6d is to be subjected to a lateral movement of .0418 inch during compression and expansion of the elements, the curvature of the surface 14 may advantageously be of a radius of 1.86 inches. By providing for a substantially uniform shipper force in this way, the maximum axial force required to be imparted to the shipper mechanism is considerably reduced, i. e., the necessity of applying a high, peak force is eliminated.

Figure 5:
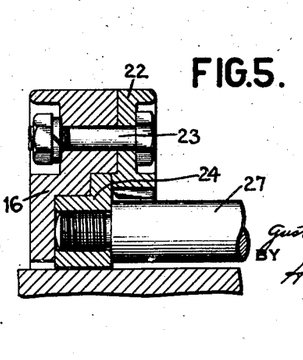
Fig. 5 is a fragmentary, vertical section illustrating the construction of a portion of the shipper mechanism.

The adjusting ring 20 is threaded to the inner circumference of the hub casing 5, so that any angular movement of the adjusting ring with respect to the hub casing will produce a relative axial movement. It will be apparent that the purpose of such an adjustment is to regulate the relationship between the roller 21, and the cam surface 14. Thus by rotating the adjusting ring the distance between the pivot of the link 18 on the arm 19 and the normal position of the surface 14 may be varied and this in turn will vary the amount of pressure applied to the friction rings 6 and 9 in the operation of the clutch. Rotation of the adjusting ring 20 is produced in the following manner: An internal gear ring 22 is fastened to the shifting ring 16 in any suitable manner, as by bolts 23 (Fig. 5). Within the shifting ring 16, and in slidable relation therewith is positioned an inner shipper ring 24. This is conveniently held within a recess in the ring 16 by means of the ring 22. A spindle 25, having its inner end journalled in the inner shipper ring 24, is provided with an integral, toothed portion or pinion 26, the teeth of which intermesh with those of the internal gear ring 22. It will be readily apparent that by rotating the spindle 25, a relative rotary movement between the inner shipper ring 24 and the internal gear ring 22 and its connected mechanism, including the shifting ring 16, the toggle mechanism, and the adjusting ring 20, will result.

Shipper rods 27, threaded into the inner shipper ring, extend outwardly through apertures 28 in the end cover 5, and are connected in any suitable manner to an outer shipper ring 29, as by the projection of a small threaded end of each rod through an opening in the outer ring and the provision of nuts on the ends of the rods. The rod 25, which may simply take the place of one of the rods 27, may extend freely through an aperture in the ring 29 and may be provided with a squared end by which it may be rotated by a key or wrench. It will be apparent that the shipper rods 27, and hence the inner and outer shipper rings 24 and 29, cannot have any rotary motion relative to the casing 1 and its connected mechanism. Hence, relative rotary motion between inner shipper ring 24 and shifting ring 16, caused by the turning of rod 25, will produce a corresponding relative rotation between adjusting ring 20 and the casing 1, thus causing relative axial movement between the adjusting ring and casing and resulting in the desired adjustment of the position of roller 21 relative to the cam surface 14.

Surrounding and embracing the outer shipper ring 29 is a shipper casing 30, comprising annular members 31 and 32, secured together in any suitable manner, as by bolts 33. The shipper casing 30 is slidably mounted with relation to outer shipper ring 29. A cylindrical stud 34 projecting laterally from the shipper casing 30 at each side of the same is adapted to be engaged by a corresponding recess or aperture in an arm of a forked lever 35, shown only in outline in Figure 1, thus providing means for shifting the shipper mechanism axially for the purpose of engaging and disengaging the clutch. The lever 35, mounted upon a fixed pivot, may be grasped and shifted manually or it may be operated in any other suitable way by power means or otherwise. When the clutch is engaged, it will be understood, the casing 1 and shipper ring 29 will rotate but the casing 30 will be held stationary.

Figure 16:
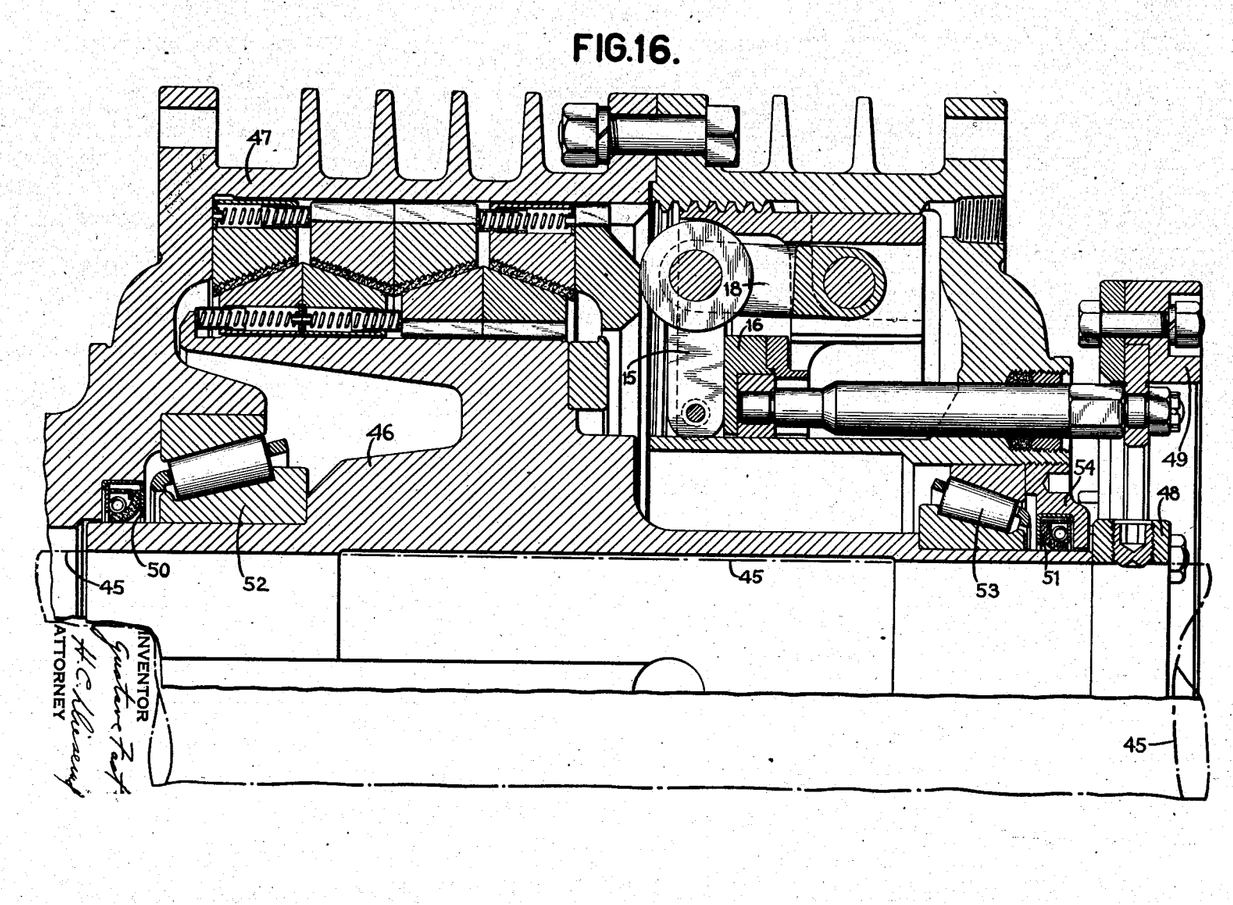
Fig. 16 is a central, longitudinal section through a portion of a further modification.

The toggle and roller mechanism may be duplicated at any suitable spaced intervals about the shifting ring, as shown in Figs. 1 and 2. In Fig. 1, two toggle and roller mechanisms are shown spaced 180° apart. Obviously a larger number might be used, spaced at equal intervals. Fig. 2 illustrates the use of three such mechanisms, spaced 120° apart. The toggle mechanisms are so arranged that when the clutch is engaged and the maximum pressure is applied, the axis of the roller 21 is in a position slightly beyond, i. e., radially outward of, the axis about which the link 18 is pivoted to the adjusting ring 20. In other words, the angle between links 15 and 18 is then slightly less than 90°. At this time a projection 15' on the link 15 is brought up against a surface 13' on the extension 13. This definite stop for the shipper and toggle mechanism can also be accomplished by having link 15 abutting against the shifting ring 16 as shown in Fig. 16. As a result, the toggle mechanism is locked in this position, and can only be withdrawn therefrom by a positive outward movement of the shipper mechanism. This is important for the reason that the reaction stresses resulting from the clutch pressure between the resilient friction rings 6 and 9 is considerable.

Coiled spacing springs 36 (Fig. 3), any suitable number of which may be distributed around the rings 9a and 9b, are confined within suitable apertures formed transversely of friction rings 9. Plungers 38, pressed outwardly to a definite position by the springs 36, abut against a shoulder provided by a flange 39 on a member carried by the hub 2 on the one hand and the next adjacent friction ring 9c on the other hand, thus keeping the first mentioned pair of rings together and at the same time centering them between the friction rings 6a and 6b. Also the pressure upon ring 9c serves to keep rings 9c and 9d together and the latter against a flange 40 on a member carried at the opposite end of hub 2 at the same time centering them between the friction rings 6c and 6d.

Figure 3:
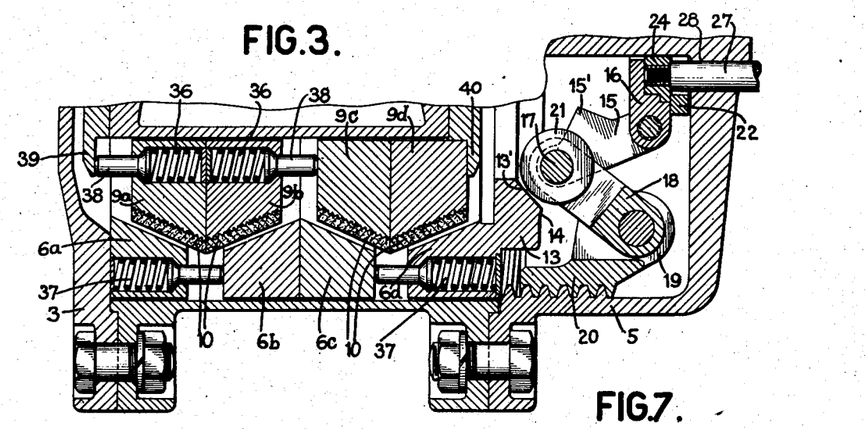
Fig. 3 is a vertical, longitudinal section of a portion of the device of Fig. 1, taken along a plane different from that of Fig. 1, to illustrate the friction element spacing means, the clutch being shown disengaged.
Figure 4:
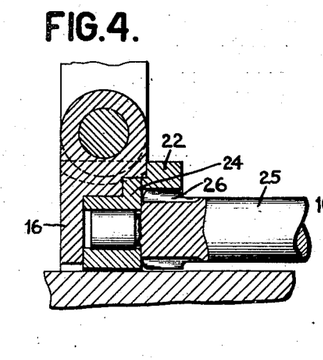
Fig. 4 is a fragmentary, vertical section illustrating the clutch adjusting means.

In a similar manner springs 37 act upon the friction rings 6 with the result that when the clutch pressure is released and the clutch surfaces are disengaged by the stored energy, the springs 36 and 37 will shift the rings 6 and 9 into the positions shown in Fig. 3, thereby maintaining definitely equal free space between the rings 6 and 9, thus minimizing the hydraulic drag due to the clutch lubricant or dressing during the "idling" of the driving member with the clutch disengaged. It will be apparent that the particular arrangement of the springs may be varied without interfering with their intended function. For example, the spring 36 in the ring 9b might be placed in the ring 9c instead and might bear against the ring 9b.

An additional advantage of definitely spacing the friction rings is that it permits a lateral float of the driving member in relation to the driven member when the clutch is disengaged without the friction surfaces rubbing against each other.

The casing 1 is preferably made oil tight so that it may be filled with a suitable lubricant or clutch dressing. For this purpose the apertures through which the rods 25 and 27 are passed may, if desired, be provided with a stuffing box filled with any suitable form of packing and closed by an adjustable packing nut. So also any convenient form of oil retaining joint may be provided between the aperture in the plate 3 of the casing and the driving shaft passing through this aperture or, if desired, a portion of the hub 2 may be extended through the plate 3 and an oil tight joint provided between the plate and hub. The purpose of the clutch dressing is to prevent direct metallic contact and to absorb the heat generated, and in this respect it resembles the lubricant in a bearing. However, the function of a lubricant in a bearing is to decrease the friction while the clutch dressing should, so far as possible, sustain the full effective friction or traction between the friction surfaces when they are engaged, and minimize wear when the clutch is being engaged. To this end the dressing, which may be oil or other liquid, should be evenly distributed between the friction surfaces in a fairly thin film. The shear stress in an oil film is inversely proportional to its thickness, hence the greatest tractive effort will be exerted through the thinnest film. However, it is important that the film be continuous, that is, that there shall be no spots in which metallic contact occurs, otherwise the friction will be increased in such spots, due to the direct metallic contact, and erratic clutch action and wear will result. The ideal condition, therefore, is a very uniform film quite thin, yet permanent enough to prevent rupture. A high viscosity oil film on the order of one millionth of an inch in thickness offers great resistance to shear which can be great enough to start enormous loads without actual metallic contact between the friction surfaces.

Figure 6:
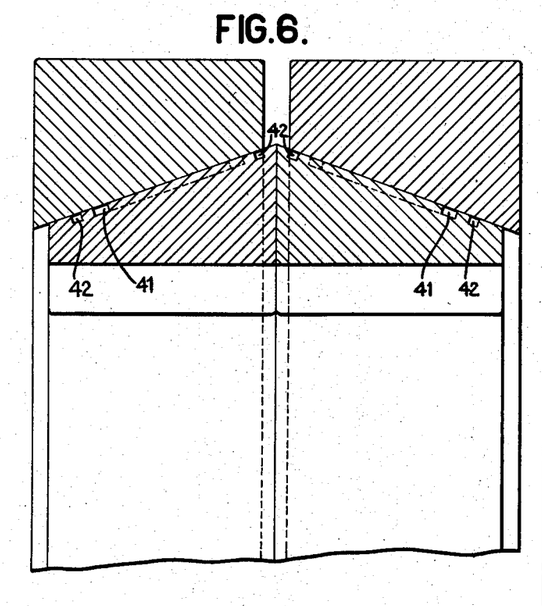
Fig. 6 is a fragmentary, vertical section of two pairs of friction members, illustrating the oil grooves therein.
Figure 7:
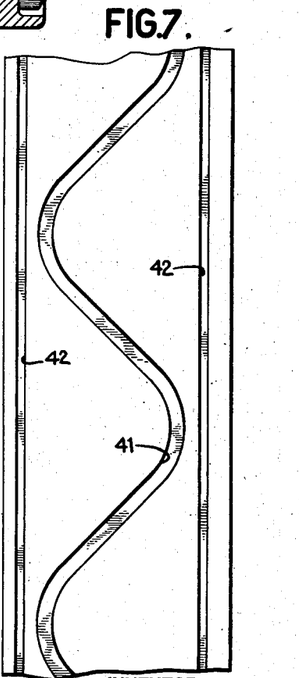
Fig. 7 is a fragmentary, elevational view of a friction member, illustrating the oil grooves therein.

The thickness of the dressing film depends upon the clutch pressure, the viscosity of the dressing, and the leakage from the friction surfaces when pressure is applied. The rate of leakage, in turn, depends upon the width of the friction surfaces and the thickness of the film between them. In Figures 6 and 7 there is shown means which may be provided to insure the proper distribution of the lubricant or clutch dressing in a film over the cooperating friction surfaces of the resilient rings. If "open" grooves are provided in the friction surfaces, that is, grooves extending to the edges of the surfaces, leakage will be rapid, and a thin film condition will be reached before the friction surfaces are synchronized in speed, thus enhancing the danger of rupture of the film and the development of excessive heat. I therefore provide the friction surfaces with grooves 41 wholly within the confines of the surfaces, which do not increase the leakage, but serve to store the dressing and feed small amounts thereof to the friction surfaces during the period when the clutch is being engaged.

Throttling grooves 42, one provided on each side of the groove 41 in each member, serve further to reduce leakage from the friction surfaces.

It is believed that the operation of the friction clutch of Figs. 1-7 inclusive, will be fully understood from the foregoing description. Its operation may be briefly summarized.

Assuming that the clutch elements are disengaged, as shown in Figure 3, the lever 35 (Figure 1) is shifted toward the left, i. e. rocked counter clockwise, to effect engagement of the clutch. Prior to this operation of the lever the hub 2 will be rotating with the driving shaft while the casing 1, with its associated parts, will be stationary. During the initial portion of the movement of the lever the inward movement (toward the left) of the shifting ring 16 will cause the links 15 to rock about their connections with ring 16 and will cause the rollers 21 to ride outwardly along the surface 13' of extension 13. The axial component of this initial shipper movement imparted to extension 13 will be quite large due to the angle of inclination of the surface 13' and the direction of movement of the rollers at this time. The amount of force required, however, is quite small inasmuch as the movement of the rings is simply resisted by the springs 36 and 37 which are comparatively light. After the clearance between the sets of rings 6 and 9 has been taken up the rollers 21 will begin to ride over the peak provided at the juncture between the surfaces 13' and 14. From this point on, the curvature of the surface 14 is such that a substantially uniform force may be applied to the shipper mechanism by the lever 35 to carry the parts into the position shown in Figure 1. The adjusting ring 20 may be readily rotated within the casing 1 when the clutch is disengaged to provide the desired action of the rollers 21 upon the extension 13 when engaging the clutch. As the links 18 are straightened into their horizontal positions the rings 6 and 9 produce a wedging effect, as explained in my prior application, the rings 6 being expanded and the rings 9 compressed and contracted. The forces tending to expand and compress the rings are considerably greater than that applied to the shipper mechanism not only due to the mechanical advantage derived from the toggle mechanism but also due to the angle of inclination of the friction faces. The resulting stresses and strains set up in the rings bring about a storage of energy therein and cause a greater percentage of their cooperating surfaces to be brought into sufficiently close contact to share in the transmission of the tractive force. Minor irregularities in the surfaces of the rings 6 which might otherwise interfere with the proper distribution of the friction producing pressure are offset by the soft, semi-plastic surfaces 10 provided on the rings 9. Under the pressures developed upon the wedging of the rings the soft metal flows sufficiently to compensate for the minor surface irregularities. By the combination of features embodied in the new clutch the torque is distributed over a maximum percentage of the friction surfaces. Release of the clutch is simply effected by a positive movement of the shipper mechanism in the opposite direction. The stored energy in the friction rings 6 and 9 will then bring about a very quick (almost instantaneous) disengagement of the friction ring surfaces and the springs 36 and 37 will cause a definite appropriate spacing of the friction surfaces during the subsequent idling of the driving shaft.

It may be observed that, since the rings 6b and 6c and also rings 9a and 9b as well as rings 9c and 9d are all made separate, there is no interference between the stresses set up by the oppositely sloping faces of the rings. Thus if the rings 6b and 6c were integral, and in effect only one ring; there would be certain interacting forces between the two sides which would interfere, to some extent, with the corrective moments tending to produce better contact between the inner and outer rings. By forming the oppositely sloping surfaces on two separate or independent ring portions the stresses set up are permitted to have their maximum corrective effect. By corrective effect I mean the tendency of the rings to bring as much of their surfaces as possible into tractive relation, as is accomplished by the expansion of the outer rings and the contraction or compression of the inner rings.

Fig. 16 illustrates a modification of the device of Figs. 1–7, the clutch itself being similar to that of Figs. 1–7, but instead of being adapted to transmit torque from one to another of a pair of shafts in line, it is adapted to permit power to be taken off of a single continuous line shaft. By this arrangement the power may be taken off at any intermediate point along the shaft, and may be transmitted to the driven machine or machines by means of belts or gearing, or other suitable power transmitting means, from the casing of the clutch, which is the driven member.

The continuous shaft 45 may carry a hub 46 extending throughout the length of the clutch casing. It is keyed or otherwise secured to the shaft to rotate at all times therewith and is provided with a portion equivalent to the hub 2 of Figure 1. A casing 47 similar to the casing 1 of the first embodiment encloses a clutch, of the same type, adapted to frictionally connect the hub and casing. A retaining ring 48 is secured to the shaft at one end of the casing and a similar ring may be provided at the opposite end, if desired. Shipper mechanism, designated generally by the character 49, may be of the same general construction as that of Figure 1. At its opposite ends the casing is provided with rings 50 and 51 carrying suitable packing means cooperating with the outer surface of the hub 46 and forming an oil tight seal therewith. Roller bearings 52 and 53 may suitably be provided between the casing and the hub adjacent their ends to permit free rotation of the hub within the casing when the clutch is disengaged. By arranging the roller bearings at an angle, as shown, the axial thrusts of the casing are readily taken up. An adjusting ring 54 may be provided at one end of the casing to hold the hub and roller bearing units in definite relation to the casing. This ring, as shown, may conveniently carry the packing ring 51. It will be apparent that the casing 47, and any machine driven thereby, may be coupled at will to the continuous shaft by shifting of the shipper mechanism in the same manner as in Figure 1.

In Figs. 8–15 there is illustrated a modified form of clutch suitable for lighter work, to be used, for instance, in automobiles, motor boats, and the like.

In this construction, the member shown in broken outline and designated 60 is the flywheel of the power source, the clutch casing 61 being secured thereto in any suitable manner as by bolts 62. The casing and connected parts of the present construction constitute the driving member of the clutch. Two friction rings 63a and 63b are carried within the casing 61 and splined thereto, in the manner heretofore described in connection with rings 6, and are provided with soft metal, semi-plastic surfaces 64 similar to the surfaces 10. Cooperating friction rings 65a and 65b are riveted or otherwise suitably secured to a diaphragm 66, which in turn is riveted or otherwise secured to a hub 67, splined to the shaft 68 which is to be driven. The friction rings 65, diaphragm 66 and hub 67 constitute the driven member of the clutch. It will be understood that the rings 63 and 65 are complete, unbroken members having suitable resilient qualities for the storage of energy when the clutch is engaged. The rings 65 preferably have only their inclined portions and the vertical flange portions 65' in the form of complete annular members and these are connected by means of arms 65'' arranged at spaced intervals around the circumference of the rings. These arms are capable of quite adequately transmitting the torque between the driving and driven members, as is also the diaphragm 66, but they interfere little, if at all, with the contraction and deflection of the inclined portions of the rings nor with the angular tilting of these portions to compensate for any errors in cone angle.

Figures 8, 12, 13:
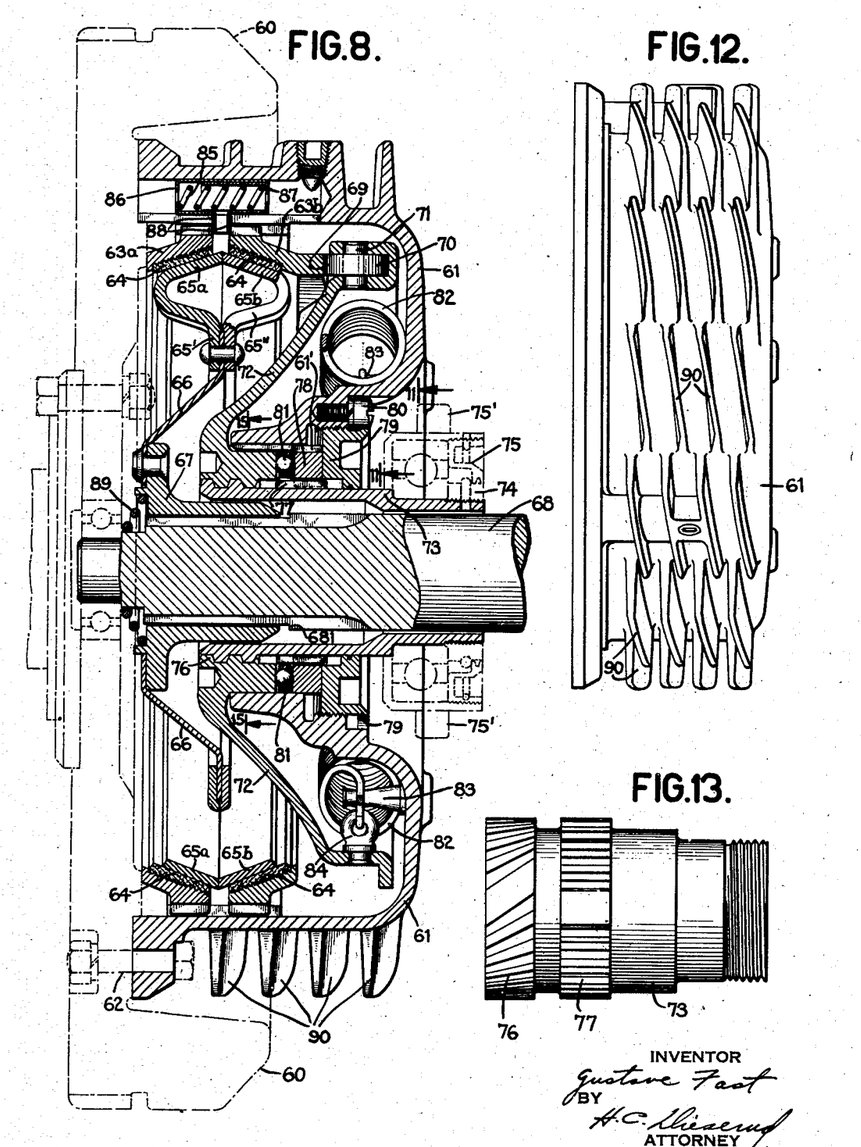
Fig. 8 is a vertical, longitudinal section along the line 8—8 of Fig. 9 through a clutch embodying a modified form of my invention.
Fig. 12 is a side view of the clutch casing.
Fig. 13 is a detail view of a clutch shifting member.
Figures 10, 11:
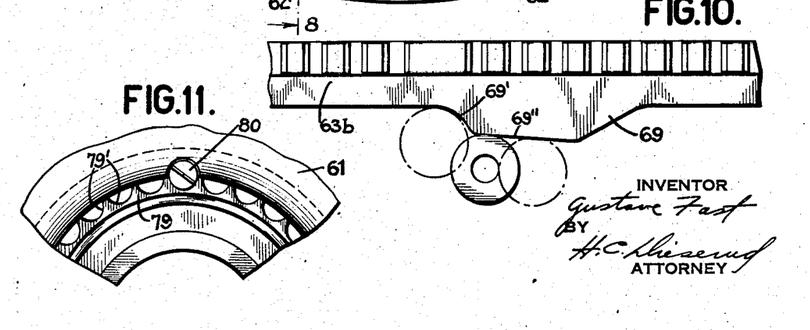
Fig. 10 is a developed view of a cam and roller employed in the construction of Fig. 8.
Fig. 11 is a fragmentary transverse, vertical section along the line 11—11 of Fig. 8, showing the means by which the adjusting means of the clutch may be locked in a desired position.
Figure 14:
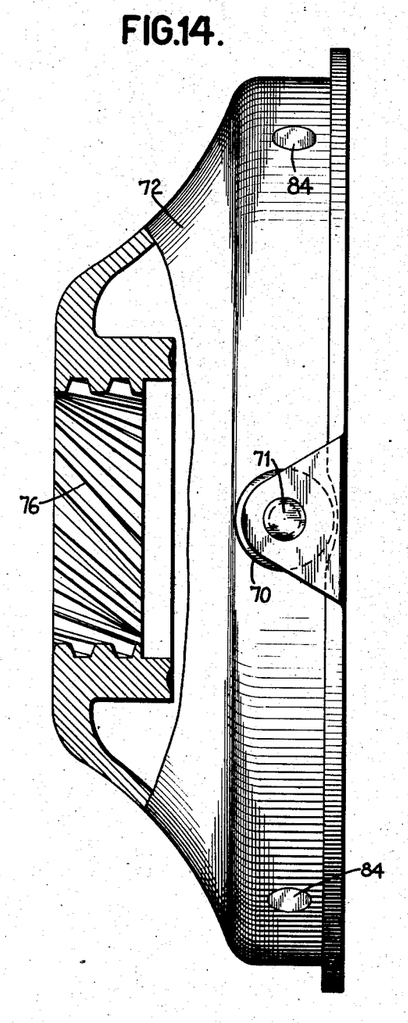
Fig. 14 is a side view, partly in section, of a shifting member employed in the Figure 8 embodiment of the invention.
Figure 15:
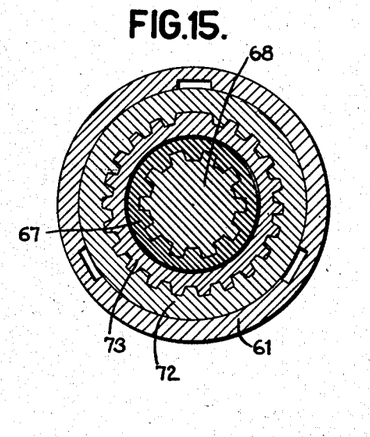
Fig. 15 is a sectional view along the line 15—15 of Figure 8.

For the purpose of forcing the friction rings into driving engagement the ring 63b is cammed toward the left in Figure 8, thereby forcing the rings 65 (a and b) toward the left, and wedging the inclined surfaces together. Cam surfaces 69, of which there are three in the present construction, are formed as laterally projecting integral portions of the friction ring 63b (Fig. 10). Lateral or axial pressure is exerted upon friction ring 63b, for the purpose of engaging the several friction surfaces, by the action of a series of rollers 70 which are caused to traverse the inclined cam surfaces 69. Rollers 70 are mounted upon supporting studs or shafts 71 which are securely fastened in a relatively rigid diaphragm structure 72 (Fig. 14). The latter is provided in this case with left hand helical splines adapted to engage corresponding splines formed on a sleeve 73. Threaded to the outer end of sleeve 73 is a nut 74, securing a suitable ball thrust bearing in place, over which is provided a casing 75 having studs or projections 75' extending therefrom and adapted to be engaged by a yoke, not shown, for the purpose of shifting the casing and causing axial movement of the sleeve 73. Ball bearings may be provided as previously indicated, between the sleeve 73 and casing 75 so that the sleeve may rotate freely while the casing may be held stationary by its shifting yoke. As stated, the sleeve 73 is provided with helical splines 76 (Fig. 13) by means of which it is engaged to the diaphragm 72. In order to prevent rotation of the sleeve relative to the casing 61, it is engaged, by means of straight splines 77, to a bearing ring 78 which is splined to casing 61 as shown at 61' and held in lateral position by an adjusting ring 79, the latter being threaded to the casing 61, and locked in the desired position relative thereto by means of a set screw 80. Referring to Figure 11 it will be seen that the head of screw 80 is adapted to cooperate with any one of a series of scallops or depressions 79' in the periphery of the ring. Therefore the adjusting ring may be rotated to any desired extent in relation to the casing and held locked thereto. By virtue of the threaded engagement between the ring 79 and the casing the relative adjustment between them will cause the ring 78 to be shifted in or out and thus determine the lateral position of the diaphragm 72.

Figure 9:
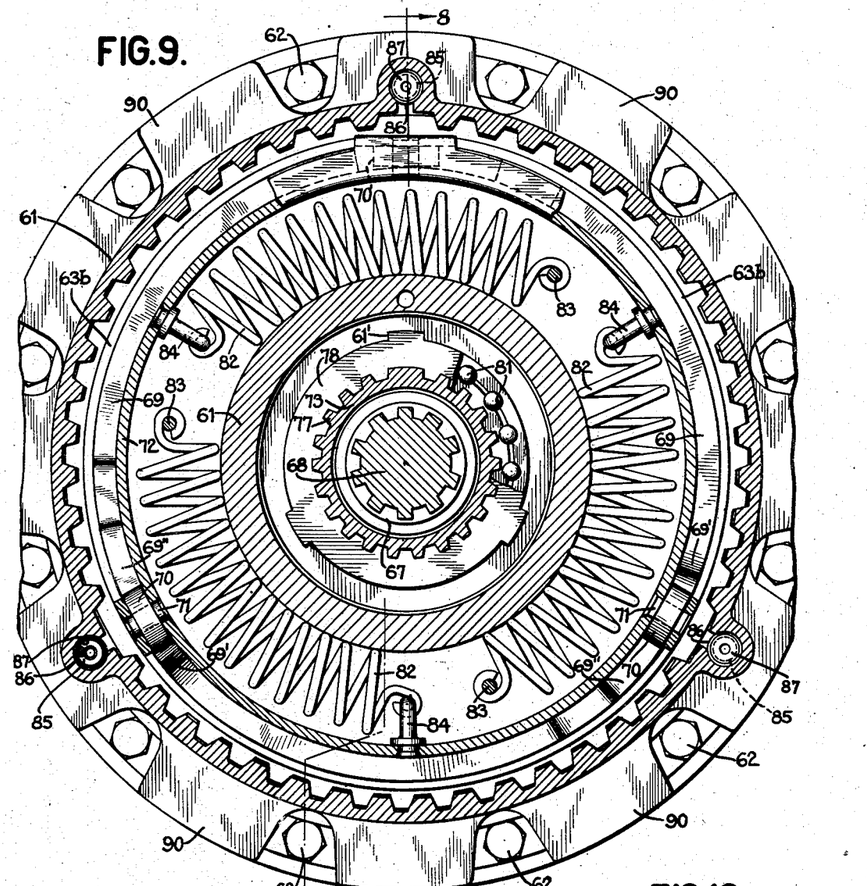
Fig. 9 is a transverse, vertical section through the construction of Fig. 8 with a portion broken away to disclose other parts.

Springs 82, three being shown in Figure 9, are fastened at one end to the casing 61, as at 83, and at the other end to the diaphragm 72, as at 84. The tension of the springs 82 will, if permitted, produce a clockwise rotation of the diaphragm 72, with respect to the casing 61 (Fig. 9). Such a clockwise rotation will result in the rollers 70 traversing the inclined cam surfaces 69 of the friction ring 63b, and causing a lateral or axial pressure thereon, thereby shifting the several friction rings toward the left in Figure 8 and engaging their friction surfaces until equilibrium is reached between the roller pressure on the cam and the reacting axial clutch force of rings 63 and 65. The axial thrust transmitted from the friction rings through the rollers 70 and diaphragm 72 is taken by ball bearings 81, which are confined between the hub of the diaphragm 72 and the bearing ring 78.

The cam surfaces 69 are so designed as to have such mechanical advantage that a considerable clutch pressure may be exerted by the tension springs 82, while, at the same time, the springs 82 need not be so strong that it will require an undue exertion upon the part of the operator to overcome them for the purpose of disengaging the clutch. The first portion 69' of the cam has a rather steep rise as its action is merely to take up the normal clearance between the friction rings. Portion 69'', which has a much higher mechanical advantage, then comes into play to produce a substantial clutch pressure. The small angle of inclination of the friction faces of the rings also brings about a pressure, normal to the faces, which is many times greater than the axial force between the cam and roller. The clutch may be disengaged by the action of the operator, by means of a suitable foot pedal, not shown, or other mechanism, connected with the casing 75 through the stud 75' and adapted to move the sleeve 73 outwardly (toward the right in Fig. 8). This will cause the diaphragm 72 to rotate in a counter-clockwise sense, relative to the casing 61 by the action of the helical spines 76, thus extending the springs 82 and causing the rollers 70 to leave the cams 69. The clutch pressure is thus released and the inherent resilience of the friction rings 63 and 65 will cause the rings to spring apart, thus disengaging the clutch. For the purpose of maintaining the rings in spaced relation during idling of the driving member a series of springs 85 may be provided. These are compressed within a cartridge formed by a pair of telescoping casings 86 and 87 which have inwardly extending projections 88 adapted to engage portions of the rings 63. Ring 63a is thus held against a shoulder on the flywheel 60 while ring 63b is urged against the rollers 70. The diaphragm 66 tends to maintain the rings 65 in a central position, the hub 67 being urged toward the right against a shoulder 68! on shaft 68 by a spring 89.

It will be observed that in this embodiment of the invention, the clutch is maintained in the engaged condition except when the tension of the springs 82 is overcome by the action of the operator.

As illustrated in Fig. 12, the clutch casing may be provided with a series of projecting fins 90, for the purpose of aiding in the dissipation of heat generated within the clutch. By curving the fins in the manner illustrated, they are made to act as a propelling means for the surrounding air, thus increasing the cooling effect. It will be understood that the casing is made substantially oil tight and is filled with a suitable lubricant or clutch dressing.

The terms and expressions employed in the foregoing specification are terms of description and not of limitation, and I do not desire to be restricted to the particular construction described and illustrated, but recognize that various modifications of the same may be made without departing from the scope of my invention. The constructions disclosed herein in detail are simply illustrative of the various features of my improvements. Obviously the number of friction rings employed in either form of clutch may be varied to suit the particular requirements. Many features disclosed herein in connection with one form of clutch may be utilized in connection with the other. For example, the heat radiating and air circulating fins may be applied to the casings 1 and 47, if desired. In lieu of using a soft metal surface on one or both of the resilient rings there may be employed sets of rust free elastic or resilient rings of ferrous or non-ferrous character, the rings of one set or both sets having attached thereto a layer of vulcanized rubber or other material. Water might then be employed as a lubricant instead of oil.

What I claim is:—

1. In a device of the class described a driving member, a driven member, a set of elastic friction elements associated with said driving member, a set of elastic friction elements associated with said driven member and adapted to cooperate with said first mentioned set to set up elastic stresses therein, one set of said friction elements being provided with friction surfaces of semi-plastic material, and means for causing the friction elements of said first set to engage the friction elements of said second set to establish said elastic stresses, certain of said elements being subjected only to expanding forces and other of said elements being subjected only to compressing forces.

2. In a device of the class described a driving member, a driven member, a set of friction elements associated with said driving member, a set of friction elements associated with said driven member, certain of the elements of each set being arranged in pairs, means for causing said first set of friction elements to engage said second set of friction elements to transmit torque through their frictional engagement, and means associated with each set of elements independently of the other set for maintaining the friction elements of one set in fixed space relationship to the elements of the other when said friction elements are not so engaged, said means maintaining the elements of said pairs in contact at all times.

3. In a device of the class described a driving member, a driven member, a set of friction elements associated with said driving member, a set of friction elements associated with said driven member, means for causing said first set of friction elements to engage said second set of friction elements to frictionally transmit torque, and means associated with each set of elements independently of the other for maintaining certain of said friction elements in fixed space relationship to other of said friction elements of the same set when said friction elements are not so engaged, said means maintaining some of the elements of each set in constant engagement.

4. In a device of the class described a driving member, a driven member, a set of friction elements associated with said driving member, a set of friction elements associated with said driven member, means for causing said first set of friction elements to engage said second set of friction elements to frictionally transmit torque, and means associated with each set of elements independently of the other for maintaining certain of said friction elements in contact with some elements of the same set and in fixed space relationship to other of said friction elements of the same set, and for maintaining the elements of one of said sets in fixed space relationship to the elements of the other set.

5. In a device of the class described a driving member, a driven member, a set of continuous, unbroken friction elements associated with said driving member, a set of continuous, unbroken friction elements associated with said driven member, said elements having surfaces adapted to be wedged together, means for causing said first set of friction elements to wedgingly engage said second set of friction elements, and means for maintaining the friction elements of one set in fixed space relationship to the elements of the other when said friction elements are not so engaged, said means holding certain of the elements of the same set in engagement at all times.

6. In a device of the class described a driving member, a driven member, a set of friction elements associated with said driving member, a set of friction elements associated with said driven member, said elements having surfaces adapted to be wedged together to cause certain of said elements to be stretched and others compressed, a cam surface associated with one of said friction elements, a roller engaging said cam surface, and means for causing said roller to exert a lateral pressure upon said cam surface to shift said elements axially into wedging relation, said cam surface, roller, and means being so constructed and arranged as to produce a substantially constant rate of energy storage by the wedging action of said friction elements during the operation of said means.

7. In a device of the class described, a driving member, a driven member, friction elements associated with said driving member, friction elements associated with said driven member adapted to be frictionally engaged with said first mentioned elements, said friction elements being provided with oil conveying grooves in their cooperating surfaces confined inwardly of the edges thereof, certain of said grooves traversing the major portion of the width of said surfaces and other of said grooves being arranged adjacent the edges of said surfaces, and means for bringing said friction elements into operative contact whereby torque is transmitted from said driving member to said driven member.

8. In a device of the class described, a driving member, a driven member, friction elements associated with said driving member, friction elements associated with said driven member, adapted to be frictionally engaged with said first mentioned elements, said friction elements having their friction surfaces provided with grooves adjacent and parallel to the edges thereof and a central groove of sinuous form.

9. In a device of the class described, a driving member, a driven member, one of said members comprising a casing, a set of friction elements associated with said driving member, a set of friction elements associated with said driven member, positive means for shifting said friction elements into driving engagement, said means having an invariable movement and including a series of rods extending through the casing, and means for adjusting the position of said shifting means with respect to said friction elements upon rotation of one of said rods.

10. In a device of the class described, a casing, a set of friction elements associated with said casing, a hub, a set of friction elements associated with said hub, an adjusting ring within said casing, means mounted in said adjusting ring, for moving said sets of friction elements axially to cause frictional engagement therebetween, and means including a shaft extending through said casing for rotating and moving said adjusting ring axially with respect to said friction elements.

11. In a device of the class described a driving member, a driven member, a cylindrical casing connected with one of said members, a plurality of friction elements within said casing, certain of said elements being connected positively with said driving member and other of said elements being positively connected with said driven member, a spring arranged circumferentially within said casing, rotatable means operated by said spring for forcing said elements into frictional engagement, said means having a fixed axial position with relation to said members, and means operable exteriorly of said casing for opposing said spring.

12. In a device of the class described a driving member, a driven member, a cylindrical casing connected with one of said members, a plurality of friction rings arranged concentrically within said casing, said rings having surfaces adapted to be wedged together, certain of said rings being positively connected with said driving member and other of said rings being positively connected with said driven member, a spring arranged circumferentially within said casing, rotatable means having a fixed axial position with relation to said members operated by said spring for forcing said rings into wedging engagement, and means operable exteriorly of the casing for opposing said spring.

13. In a device of the class described a driving member, a driven member, a cylindrical casing connected with one of said members, a plurality of friction elements within said casing, said elements being normally spaced apart and being shiftable into wedging relation, a spring arranged circumferentially within said casing, means operated by said spring for forcing said elements into wedging engagement, said means including a cam operable to quickly bring said elements together and then produce a wedging action at a mechanical advantage, and means operable exteriorly of said casing for opposing said spring.

14. In a device of the class described a driving member, a driven member, a casing connected with one of said members, a plurality of unbroken rings within said casing adapted to be shifted axially to frictionally connect said driving and driven members, certain of said rings being positively connected with said driving member and other of said rings being positively connected with said driven member, rotatable means for shifting said rings axially, a spring adapted to rotate said means in one direction, and a member for positively forcing said means in the opposite direction against the action of said spring and independently of the direction of rotation of the driving member.

15. In a device of the class described a driving member, a driven member, a casing connected with one of said members, a plurality of unbroken rings within said casing adapted to be shifted axially to frictionally connect said driving and driven members, certain of said rings being positively connected with said driving member and other of said rings being positively connected with said driven member, rotatable means for shifting said rings axially, a spring adapted to rotate said means in one direction, and a member for positively forcing said means in the opposite direction against the action of said spring and independently of the direction of rotation of the driving member, said positively forcing member and means having cooperating helical teeth.

16. In a device of the class described a driving member, a driven member, a casing connected with one of said members, a plurality of unbroken rings within said casing adapted to be shifted axially to frictionally connect said driving and driven members, certain of said rings being positively connected with said driving member and other of said rings being positively connected with said driven member, rotatable means for shifting said rings axially, a spring adapted to rotate said means in one direction, and a member coaxial with said rings and shiftable axially thereof for positively forcing said means in the opposite direction against the action of said spring independently of the direction of rotation of the driving member.

17. In a device of the class described a driving member, a driven member, a casing connected with one of said members, a set of friction rings having splined connection with said casing, a diaphragm having splined connection with the other of said members, a second set of friction rings connected to said diaphragm, the rings of said sets having surfaces adapted to be wedged together to expand one set and compress the other, and means for shifting said rings to wedge said surfaces and effect a driving connection between said members.

18. In a device of the class described a driving member, a driven member, a casing connected with one of said members, a set of unbroken, resilient friction rings having splined connection with said casing, a diaphragm having splined connection with the other of said members, a second set of unbroken, resilient friction rings resiliently connected to said diaphragm, the rings of said sets having surfaces adapted to be wedged together, and means for shifting said rings to wedge said surfaces, thereby expanding one set of rings and contracting the other set.

19. In a device of the class described a driving member, a driven member, a casing connected with one of said members, a set of friction rings having splined connection with said casing, a diaphragm having splined connection with the other of said members, a second set of friction rings connected to said diaphragm, the rings of said sets having surfaces adapted to be wedged together, and means for shifting said rings to wedge said surfaces, said means comprising a rotatable member coaxial with said rings, and a cam operable upon rotation of said member to effect said shifting.

20. In a device of the class described a driving member, a driven member, a plurality of friction elements adapted to effect a driving connection between said members, certain of said elements being connected positively with said driving member and other of said elements being positively connected with said driven member, rotatable means coaxial with one of said members for shifting said elements into driving engagement, spring means for rotating said first mentioned means in one direction to effect such driving engagement, and an axially slidable element surrounding one of said members and adapted upon movement in one direction to rotate said rotatable means against the action of said spring means independently of the direction of rotation of said driving member.

21. In a device of the class described a driving member, a driven member, a plurality of friction elements adapted to effect a driving connection between said members, certain of said elements being connected positively with said driving member and other of said elements being positively connected with said driven member, rotatable means coaxial with one of said members for shifting said elements into driving engagement, spring means for rotating said first mentioned means in one direction to effect such driving engagement, an axially slidable element surrounding one of said members and adapted upon movement in one direction to rotate said rotatable means against the action of said spring means independently of the direction of rotation of said driving member, and means for preventing rotation of said slidable element relative to one of said members.

22. In a device of the class described a driving member, a driven member, friction elements shiftable axially of said members to effect a driving connection, an axially adjustable ring carried by one of said members, said ring and member having cooperating helical teeth, a housing enclosing said members, elements and ring, means extending exteriorly of the housing for rotating said ring to cause axial adjustment thereof, and means carried by said ring and operable by said last mentioned means for shifting said elements.

23. In a device of the class described, a driving member, a driven member, a set of friction elements positively connected with said driving member, a set of friction elements positively connected with said driven member, each of said friction elements being in the form of a continuous, unbroken band and having its friction surface of uniform and uni-directional inclination at an angle of less than 45° to the axis of the band and adapted to frictionally engage only one band of the other set, and means for bringing said sets of friction elements into engagement and storing stress strain energy in said elements, one set being subjected to only tensile stress and the other set to only compressive stress, whereby rotary motion may be transmitted from one of said members to the other of said members.

24. In a device of the class described, a driving member, a driven member, friction elements connected with each of said members, a casing surrounding the friction elements and adapted to rotate with one of said members and a plurality of short heat conducting and radiating fins projecting outwardly from the surface of said casing and arranged in staggered relation at an angle to the axis of rotation to force an air flow around themselves and the casing, thus cooling themselves and the casing, thereby increasing their heat convexion capacity.

25. In a device of the class described, a driving member and a driven member concentrically arranged, a set of friction elements positively connected with each of said members, the elements of one set being normally spaced from the elements of the other, said elements being adapted to be forced together into frictional engagement, rotatable means for forcing said elements together, cam means for controlling the action of said rotatable means and arranged to vary the mechanical advantage at which said rotatable means acts upon said elements after a predetermined angle of rotation, and adjustable means for regulating the initial relative position of said rotatable means.

26. In a device of the class described, a driving member, a driven member, a set of friction elements associated with said driving member, a set of friction elements associated with said driven member, said elements having surfaces adapted to be wedged together, a ring associated with one of said members and provided with a cam surface, rollers engaging said cam surface, toggle mechanisms for causing said rollers to traverse said cam surface, thereby forcing said friction elements into wedging action and storing stress strain energy in the same, slidable means to operate said toggle mechanisms, said cam surface being of such arcuate cross section that it will produce a substantially uniform rate of energy storage in said friction elements upon equal increments of movement of said slidable means after wedging action between said friction elements has started.

GUSTAVE FAST.